(12) United States Patent
Hilliard

(10) Patent No.: US 6,749,654 B2
(45) Date of Patent: Jun. 15, 2004

(54) DUST FILTRATION FRAME AND DISPOSAL COVER

(76) Inventor: James E. Hilliard, 12 Lincoln Green Drive, Markham, Ontario (CA), L3P1R5

( * ) Notice: Subject to any disclaimer, the term of this patent is extended or adjusted under 35 U.S.C. 154(b) by 0 days.

(21) Appl. No.: 09/870,182

(22) Filed: May 30, 2001

(65) Prior Publication Data

US 2002/0178704 A1 Dec. 5, 2002

(51) Int. Cl.[7] ............................................... B01D 29/05
(52) U.S. Cl. ..................... 55/385.1; 55/367; 55/369; 55/480; 55/481; 55/490; 55/506; 55/511; 55/DIG. 31; 55/DIG. 35
(58) Field of Search ................................ 55/385.1, 480, 55/481, 490, 492, 506, 508, 511, DIG. 31, DIG. 35, 367, 369

(56) References Cited

U.S. PATENT DOCUMENTS

| | | |
|---|---|---|
| 3,963,467 A | 6/1976 | Rolschau |
| 4,627,781 A | 12/1986 | Borgner |
| 5,176,570 A * | 1/1993 | Liedl .................... 55/DIG. 31 |
| 5,226,941 A | 7/1993 | Uibel |
| 5,268,892 A | 12/1993 | Tatsuno |
| 5,462,569 A * | 10/1995 | Benjamin ............... 55/DIG. 31 |
| 5,468,272 A * | 11/1995 | Schmierer .................... 55/367 |
| 5,472,465 A * | 12/1995 | Schmierer .................... 55/367 |
| 5,611,728 A | 3/1997 | Arold |
| 5,766,283 A | 6/1998 | Bumb |
| 5,776,218 A * | 7/1998 | Enns ...................... 55/DIG. 31 |
| 5,820,643 A * | 10/1998 | Lienenluke et al. .......... 55/367 |
| 5,863,310 A * | 1/1999 | Brown et al. .......... 55/DIG. 31 |
| 5,935,282 A * | 8/1999 | Lin ....................... 55/DIG. 31 |
| 6,030,427 A * | 2/2000 | Sorice et al. .......... 55/DIG. 31 |
| 6,136,056 A * | 10/2000 | Krehan ........................ 55/367 |
| 6,151,212 A * | 11/2000 | Schwenk et al. ....... 55/DIG. 31 |
| 6,241,794 B1 * | 6/2001 | Jadran et al. .......... 55/DIG. 31 |
| 6,284,010 B1 * | 9/2001 | Rehmert ................ 55/DIG. 31 |
| 6,310,770 B1 | 10/2001 | Negishi |
| 6,361,578 B1 * | 3/2002 | Rubinson ............... 55/DIG. 31 |
| 6,425,945 B1 * | 7/2002 | Cheng ................... 55/DIG. 31 |

* cited by examiner

Primary Examiner—Minh-Chan T. Pham

(57) ABSTRACT

A dust collection system includes a housing defining an inlet and an outlet. A fan is situated within the housing to move air from the inlet to the outlet, and a filter is removably attached to the housing to collect dust entering the housing. To prevent dust from escaping the filter when it is removed from the housing for cleaning or disposal a cover is removably attached to the filter when it is desired to remove the filter. To insure the cover is available the next time it is necessary to remove the dust-laden filter, the cover may be attachable to the housing for storage thereon.

17 Claims, 3 Drawing Sheets

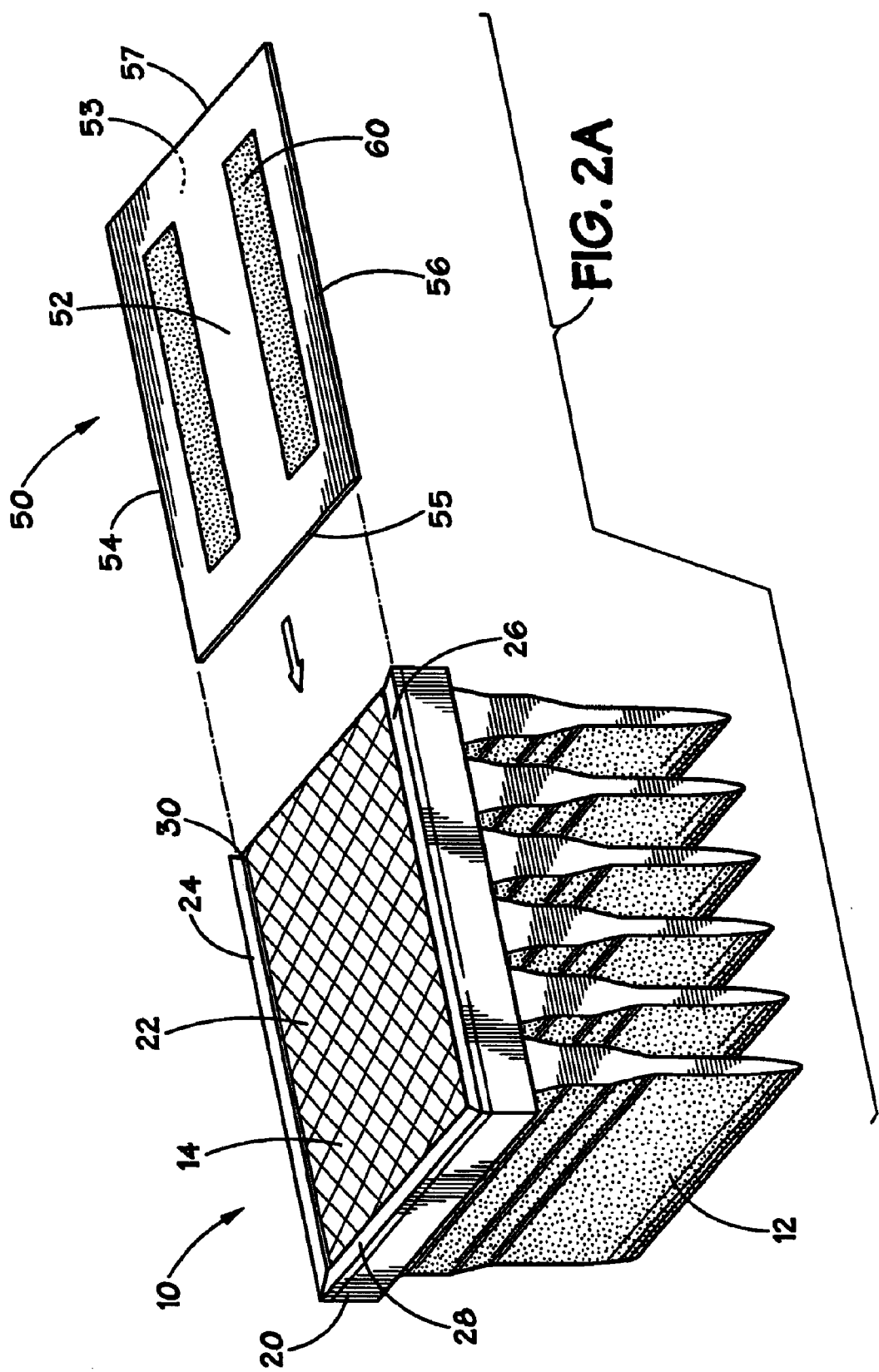

DUST FILTRATION FRAME AND DISPOSAL COVER

BACKGROUND OF THE INVENTION

1. Field of the Invention

The present invention relates generally to the field of disposable filters for airborne particle collection units, and more specifically to a device and method for the clean disposal of filters using a cover.

2. Description of Related Art

Airborne particle collection systems typically employ filters to remove particles from the air as it is passed into an intake of the filter and through the filter. The particle collection unit is typically hung from the ceiling or placed on a work surface. Units may collect particles such as general dust, saw dust, fine shavings, airborne fibers and the like. After the unit has been operating for a significant length of time in a particle-laden environment, the accumulated particles within the filter prohibit airflow through the filter. At this point, the filter requires cleaning or disposal. As the filter is removed from the collection unit and handled during the procedure, the collected particles can escape from the intake of the filter and become airborne again.

The present invention presents a solution to the problem previously described by closing the intake of the filter and preventing the captured particles from escaping during this service procedure.

SUMMARY OF THE INVENTION

In one aspect of the present invention, a filter device for use in a particle collection unit includes a frame defining an intake end, with a filter member connected to the frame for collecting particles entering the intake. A cover removably attachable to the intake end of the frame to prevent particles from escaping the filter device through the intake end, for example, when a user removes the filter to empty dust therefrom. Further, the cover may be removably attachable to the particle collection unit for storage thereon, insuring it is available to a user desiring to empty dust from the filter. In certain embodiments of the invention, a magnet is used to removably attach the cover to the collection unit. The cover may attach to the intake end of the frame, for example, by sliding the cover into a channel defined by the frame.

In other aspects of the invention, a dust collection system has a housing defining an inlet and an outlet. A fan is situated within the housing to move air from the inlet to the outlet, and a filter is removably attached to the housing to collect dust entering the housing. A cover is provided that is attachable to the filter to prevent collected dust from escaping the filter when the filter is removed from the inlet of the housing. Moreover, the cover can be attachable to the housing for storage thereon, so that it is readily available to a user each time the filter is removed.

In still further aspects of the invention, a method for collecting airborne dust is disclosed. The method includes attaching a filter inside of a housing. Dust-laden air is moved through the filter to collect dust in the filter, for example, by a fan situated within the housing. When it is desired to remove the filter from the housing, a cover is attached to an inlet of the filter. The filter is then removed from the housing, and the cover prevents dust from escaping therefrom. The cover may be removably attached to an outside surface of the housing for storage prior to removing the filter. After emptying dust from the filter, the cover may be removed from the filter inlet and re-attached to the housing for re-use.

BRIEF DESCRIPTION OF THE DRAWINGS

Other objects and advantages of the invention will become apparent upon reading the following detailed description and upon reference to the drawings in which:

FIG. 2A is a perspective view of a filter device in accordance with the present invention;

Figure 1:
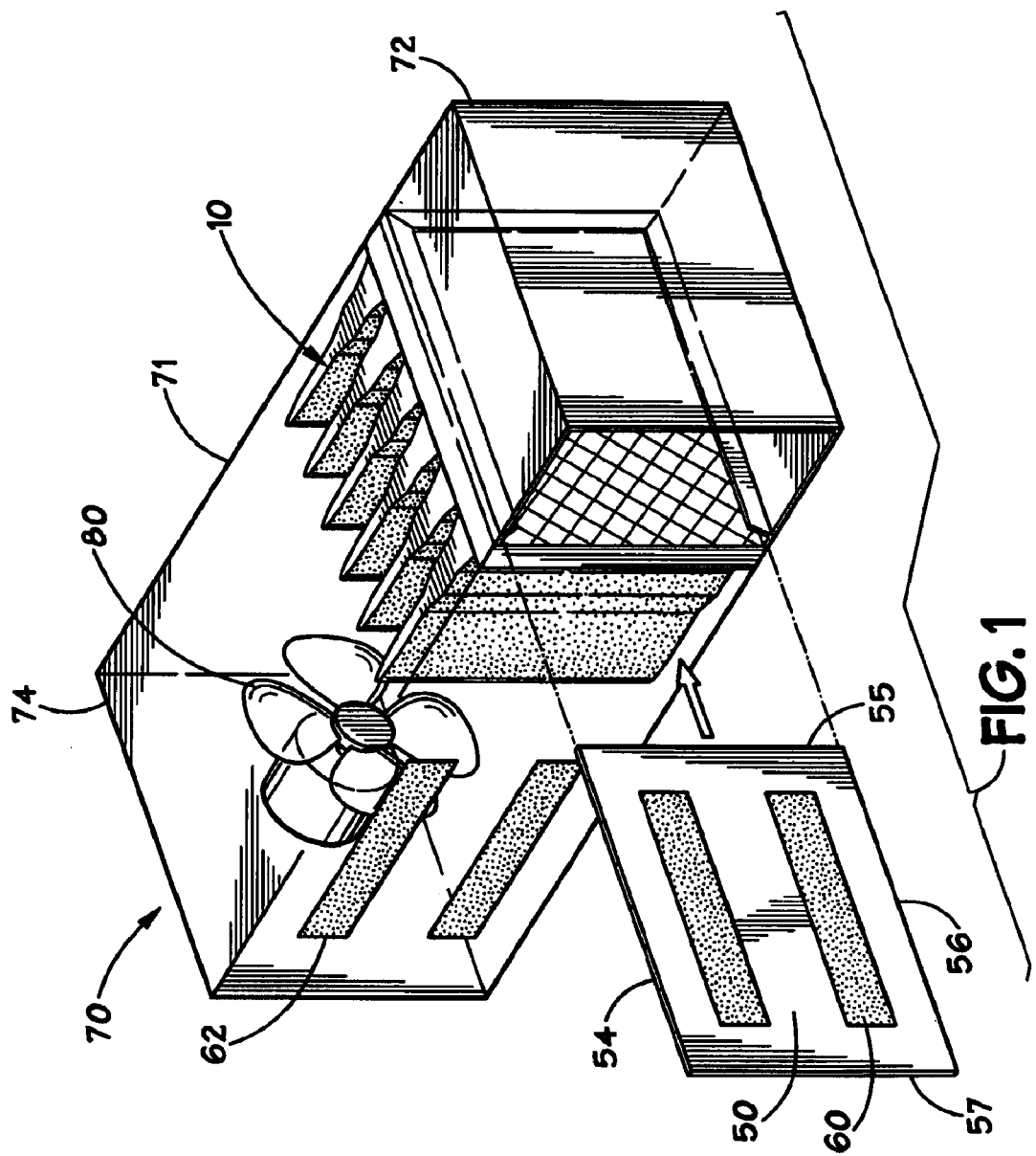
FIG. 1 is a perspective view of a dust collection system in accordance with aspects of the present invention.
Figure 2B:
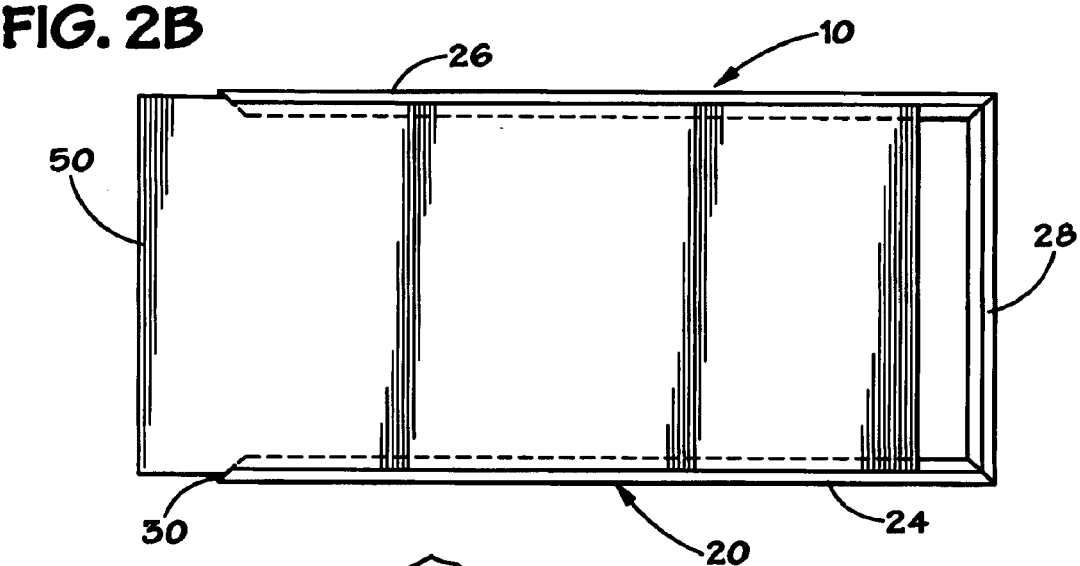
FIG. 2B is a top view of a filter device in accordance with the present invention showing a mess arrest cover partially received by a filter frame.
Figure 2C:
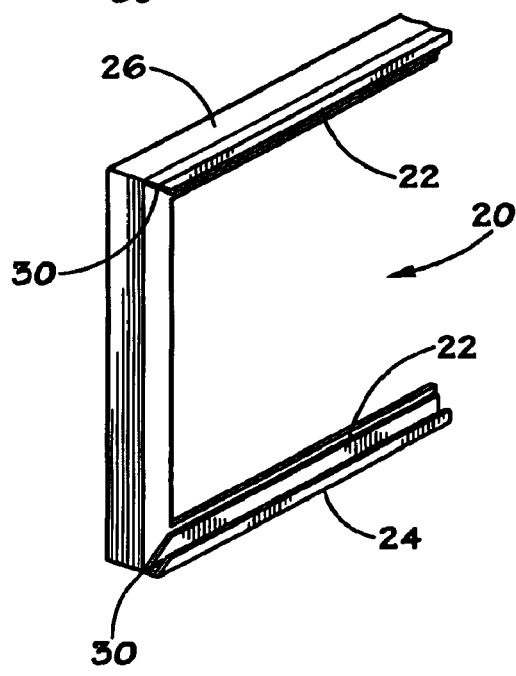
FIG. 2C is a partial end view in perspective of the filter device shown in FIG. 2B.
Figure 2D:
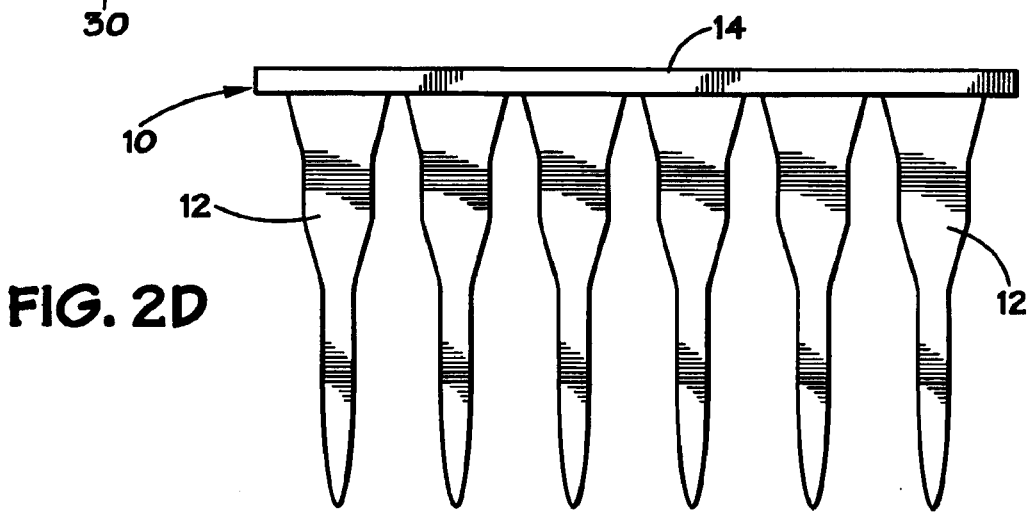
FIG. 2D is a side view of the filter device shown in FIG. 2B.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

FIG. 1 illustrates an exemplary dust collection system 70 employing a particle filter 10 in accordance with aspects of the present invention. The particle collection system 70 typically has a conduit or housing 71 in which the particle filter 10 resides. In the exemplary embodiment of the invention shown in FIG. 1, a metal housing 71 is used for the dust collection system 70. The housing of the particle collection system 70 includes an inlet 72 and an outlet 74. A fan 80 or other air moving device typically moves air through the system 70, such that particle-laden air passes into the inlet 72, is filtered through the filter 10, and leaves through the outlet 74.

FIGS. 2A–2D illustrate the particle filter 10 and the cover 50 in greater detail. The filter 10 includes a frame 20 having an intake 14 and a filter member 12 attached to the frame 20 and situated adjacent the intake 14. The frame 20 defines a channel 22 that holds a mess arrest cover 50. During normal operation, the particle filter 10 resides in the particle collection system 70, while the cover 50 is removably attached to the outside of the particle collection system 70 for temporary storage.

The particle filter 10 includes a filter frame 20 to which filter material 12 is attached. In the illustrated embodiment, an extruded frame 20 is employed, though the frame 20 may be composed of any suitable material. The frame 20 defines an air intake end 14 where particle-laden air enters. The intake end 14 of the frame 20 includes a channel 22 formed by retaining members 24, 26, 28, and having at least one channel opening 30 on an edge of the frame 20 to slidably receive the cover 50. The retaining members 24, 26, 28 may be integrally formed with the frame 20. Other methods of removably attaching the cover 50 to the intake end 14 of the frame 20 are contemplated, such as adhesive tape, VELCRO, clips, snaps, screws, etc.

The cover 50 is composed of a flat sheet of sturdy material having a top edge 54, a leading edge 55, a bottom edge 56 and an outside edge 57. The cover 50 has one or more fasteners 60 adhered to a side 52 to removably attach the cover 50 to the housing 71 for storage. The housing 71 of the illustrated embodiment defines a generally rectangular cross-section that is suitable for being suspended from a ceiling or placed on a surface. Thus, the cover 50 is rectangular. Of course, the dust collection system 70 may employ a housing 71 of any suitable shape, and the cover 50 would then be correspondingly shaped to cover the intake end 14 of the filter 10.

After the dust collection system 70 has been operating for a significant length of time in a dust laden environment, the accumulated dust within the filter material 12 hampers or prohibits air flow through the filter 10, requiring the filter 10 be cleaned or replaced. For removal of the particle filter 10, such as when a user wishes to empty the dust therefrom, the particle collection system 70 opens to reveal the particle filter 10. The cover 50 is remove from the outside of the particle collection system 70 where it has been stored and slides into the channel 22 of the frame 20. The cover 50 inserts until it substantially covers the intake 14 and attaches thereto.

The particle filter 10 with retained cover 50 may then be removed from the particle collection system 70. The retained cover 50 prevents the captured particles from becoming airborne during removal of the particle filter 10. At this point, the particle filter 10 can be moved to another location for cleaning or disposal without the particles escaping. When the filter 10 is cleaned out or disposed of, the cover 50 slides out of the channel 22 of the particle filter 10. The cover 50 is than re-attaches to the particle collection system 70 for future use. Re-attaching the cover 50 to the housing 71 insures that it will be available to the user the next time it is necessary to remove the filter 10 from the collection system 70.

The cover 50 may be removably attached to the housing 71 of the system 70 by several different means. For example, in the embodiment illustrated in FIG. 1, adhesive backed magnetic material 60 is attached to the cover 50, allowing the cover 50 to be removably attached to the metal housing 71. One skilled in the art having the benefit of this disclosure could use any number of means for attaching the cover 50 on the particle collection system 70 for storage. For example, a metallic cover 50 may be utilized with a magnet connected to the housing 71. Other configurations of the system 70 use hook and loop fastening systems such as VELCRO, or adhesives may be used to store the cover 50 on the housing 71 until it is needed. In a still further embodiment, the cover 50 is simply laid on top of the unit.

The cover 50 positions into the channel 22 by inserting the leading edge 55 into the channel opening 30. Ideally, the cover 50 inserts with the outside surface 52 facing away from the filter material 12 so as not to damage the magnetic material 60. A top edge 54 and a bottom edge 56 then ride along retainers 24 and 26 of the frame 20. The retainers 24 and 26 guide the cover 50 on a plane parallel to the intake end 14. The cover 50 continually inserts until an inner surface 53 substantially covers the intake end 14. When the leading edge 55 meets the inside retainer 28 and when the outside edge 57 of the cover 50 meets the edge of the opening 30 of the frame 20, the insertion is complete.

Other channel configurations may be employed in alternative embodiments. For example, only the retainer 24 on the top edge and the retainer 26 on the bottom edge may be used, allowing the cover 50 to be slidably received in the channel 22 at either end thereof. In this way, the particle filter 10 is accessible regardless of its initial orientation in a particle collection unit. Such an arrangement would be especially advantageous if access to the particle filter 10 is limited in the collection unit 70.

As disclosed, the present invention offers an economical and simple device to remove particle filters without particles escaping during the procedure. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A filter device for use in a particle collection unit, comprising:
   a frame defining an intake end;
   a filter member connected to the frame for collecting particles entering the intake; and
   a cover removably attachable to the intake end of the frame to prevent particles from escaping the filter device through the intake end, wherein the cover is further removably attachable to the particle collection unit for storage thereon.

2. The filter device of claim 1, further comprising a fastener attached to the cover for removably attaching the cover to the particle collection unit between uses.

3. The filter device of claim 2, wherein the fastener comprises a magnet attached to the cover for attaching the cover on the particle collection unit between uses.

4. The filter device of claim 1, wherein the frame defines a channel for slidably receiving the cover.

5. The filter device of claim 1, wherein the frame includes at least one retaining member that forms the channel.

6. The filter device of claim 1, wherein the retaining member is integrally formed from the frame.

7. A dust collection system, comprising:
   a housing defining an inlet and an outlet;
   a fan situated within the housing to move air from the inlet to the outlet;
   a filter removably attached to the housing to collect dust entering the housing; and
   a cover, wherein
      the cover is attachable to the filter to prevent collected dust from escaping the filter when the filter is removed from the inlet of the housing, and
      the cover is attachable to the housing for storage thereon.

8. The dust collection system of claim 7, further comprising a fastener for attaching the cover to the housing.

9. The dust collection system of claim 8, wherein the fastener comprises a magnet attached to the cover for removably attaching the cover to the housing between uses.

10. The dust collection system of claim 8, wherein the fastener comprises a magnet attached to the housing for removably attaching the cover to the housing between uses.

11. The dust collection system of claim 7, wherein the filter includes a frame defining a channel for slidably receiving the cover.

12. The dust collection system of claim 11, wherein the channel is formed integrally from material of the frame.

13. A method for collecting airborne dust, comprising:

situating a dust filter inside a housing;

removably attaching a cover to an outside surface of the housing;

moving dust-laden air through the filter to collect dust in the filter;

removing the cover from the outside surface of the housing and attaching the cover to an inlet of the filter to block the inlet; and removing the filter from the housing.

14. The method of claim 13, further comprising removing the cover from the filter and re-attaching the cover to the housing.

15. The method of claim 13, wherein attaching the cover to the inlet of the filter further comprises sliding the cover into a channel situated adjacent the inlet of the filter.

16. The method of claim 13, wherein removably attaching the cover to the housing includes attaching a magnet to at least one of the cover or the housing.

17. A dust collection system, comprising:

a housing defining an inlet and an outlet;

a fan situated within the housing to move air from the inlet to the outlet;

a filter removably attached to the housing to collect dust entering the housing;

first means for preventing collected dust from escaping the filter when the filter is removed from the housing; and second means for attaching the first means to the housing.

* * * * *